United States Patent
Ying et al.

(10) Patent No.: US 9,698,427 B2
(45) Date of Patent: Jul. 4, 2017

(54) PARTICLE EXHIBITING CATALYTIC ACTIVITY

(71) Applicant: Agency for Science, Technology and Research, Singapore (SG)

(72) Inventors: Jackie Y. Ying, Singapore (SG); Jinhua Yang, Singapore (SG); Xiaojun Chen, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 65 days.

(21) Appl. No.: 14/397,410

(22) PCT Filed: Apr. 26, 2013

(86) PCT No.: PCT/SG2013/000168
§ 371 (c)(1),
(2) Date: Oct. 27, 2014

(87) PCT Pub. No.: WO2013/162476
PCT Pub. Date: Oct. 31, 2013

(65) Prior Publication Data
US 2015/0079499 A1    Mar. 19, 2015

(30) Foreign Application Priority Data
Apr. 26, 2012    (SG) ................. 201203111-8

(51) Int. Cl.
*H01M 4/92* (2006.01)
*H01M 4/88* (2006.01)
*H01M 4/90* (2006.01)

(52) U.S. Cl.
CPC ......... *H01M 4/925* (2013.01); *H01M 4/8825* (2013.01); *H01M 4/9041* (2013.01)

(58) Field of Classification Search
CPC ... H01M 4/8825; H01M 4/9041; H01M 4/925
See application file for complete search history.

(56) References Cited

U.S. PATENT DOCUMENTS

| | | | |
|---|---|---|---|
| 2007/0031722 A1 | 2/2007 | Adzic et al. | |
| 2010/0062929 A1 | 3/2010 | Virkar | |
| 2010/0197490 A1 | 8/2010 | Adzic et al. | |
| 2010/0216632 A1* | 8/2010 | Adzic | H01M 4/8657 502/101 |

(Continued)

FOREIGN PATENT DOCUMENTS

WO    WO-2013/162476    10/2013

OTHER PUBLICATIONS

"International Application No. PCT/SG2013/000168, International Preliminary Report on Patentability mailed Apr. 7, 2014", (Apr. 7, 2014), 14 pgs.

(Continued)

*Primary Examiner* — Carlos Barcena
(74) *Attorney, Agent, or Firm* — Schwegman Lundberg & Woessner, P.A.

(57) ABSTRACT

A particle exhibiting catalytic activity comprising (a) an inner core formed of an alloy material; and (b) an outer shell formed of a metal material surrounding the inner core, wherein the alloy material is selected such that the inner core exerts a compressive strain on the outer shell.

19 Claims, 10 Drawing Sheets

(56) References Cited

U.S. PATENT DOCUMENTS

2011/0086295 A1* 4/2011 Lopez ................... H01M 4/921
                                                                  429/524
2011/0245068 A1   10/2011  Stamenkovic et al.
2012/0046164 A1    2/2012  Tanaka et al.

OTHER PUBLICATIONS

"International Application No. PCT/SG2013/000168, International Search Report mailed Jul. 24, 2013", (Jul. 24, 2013), 5 pgs.

* cited by examiner

PARTICLE EXHIBITING CATALYTIC ACTIVITY

PRIORITY CLAIM TO RELATED APPLICATIONS

This application is a U.S. national stage application filed under 35 U.S.C. §371 from International Application Serial No. PCT/SG2013/000168, which was filed Apr. 26, 2013, and published as WO 2013/162476 on Oct. 31, 2013, and which claims priority to Singapore Application No. 201203111-8, filed Apr. 26, 2012, which applications and publication are incorporated by reference as if reproduced herein and made a part hereof in their entirety, and the benefit of priority of each of which is claimed herein.

TECHNICAL FIELD

The present invention generally relates to a particle exhibiting catalytic activity. The present invention also relates to a method for forming the particle exhibiting catalytic activity.

BACKGROUND

A fuel cell is an electrochemical device made up of a fuel electrode (anode), an oxidizer electrode (cathode), an electrolyte surrounding the electrodes and supply streams for separately supplying a stream of the fuel and a stream of oxidizing agent to the anode and cathode respectively.

Conventionally, an electrocatalyst may be used in the anode and/or the cathode. During operation, fuel supplied to the anode is oxidized on the electrocatalyst in the presence of the electrolyte to release electrons. Meanwhile, the oxidizing agent supplied to the cathode is reduced on the electrocatalyst in the presence of the electrolyte while consuming the electrons supplied from the anode via an external circuit. Hence, the catalytic activity of the electrocatalyst has a vital role in the output and service life of the fuel cell.

Electrocatalysts comprising nanostructured platinum have been commonly used for the electrodes. However, the kinetic limitation for oxygen reduction reaction (ORR) when platinum is used remains a concern as the fuel cell performance is limited by the cathodic reaction, resulting in substantial loss of potential at which this reaction is taking place. Limitation of the ORR kinetics and long-term stability may arise as the platinum electrocatalysts suffer from poisoning associated with electrolytes and the hydroxyl layer. To compensate for the sluggish kinetics, undesirable high platinum loading is required for the cathode catalyst to achieve good electrocatalytic activity for ORR.

In addition, other factors such as high cost, scant availability of platinum and loss of catalytic activity due to catalyst degradation have further limited commercial applications of fuel cell technologies that rely on platinum electrocatalysts. In particular, substantial loss of electrocatalytic activity in the cathode during fuel cell operation may be attributed to the dissolution and coarsening of the platinum particles. Hence, other types of electrocatalysts have been explored to improve the performance of ORR electrocatalysts and reduce the amount of platinum needed.

One of the developments includes engineering platinum electrocatalysts by modifying platinum nanoparticles with gold clusters to enhance the catalyst durability and reduce platinum loading. Although such systems exhibit negligible activity loss between operations of 0.6V and 1.1V for more than 30,000 cycles, there was no significant improvement in the electrocatalytic activity of the gold cluster-modified platinum system. This may be because gold is not an active catalyst for the ORR in this system.

Accordingly, there is a need to provide a particle with catalytic activity that overcomes, or at least ameliorates, one or more of the disadvantages described above.

There is a need to provide a method of forming a particle exhibiting catalytic activity that overcomes, or at least ameliorates, one or more of the disadvantages described above.

SUMMARY

According to a first aspect, there is provided a particle exhibiting catalytic activity, the particle comprising (a) an inner core formed of an alloy material; and (b) an outer shell formed of a metal material surrounding the inner core; wherein the alloy material is selected such that the inner core exerts a compressive strain on the outer shell.

The alloy material of the inner core may have a smaller lattice parameter as compared to that of the metal material of the outer shell.

The alloy material may be a binary combination of two transition metals.

Advantageously, the compressive strain exerted by the inner core on the outer shell may be able to significantly enhance the catalytic activity of the particle. When the particle is used to catalyse an oxygen reduction reaction (ORR), the effect of this compressive strain is to change the electronic band, surface, or structure of the outer shell of the particle, resulting in weakened chemisorption of any adsorbed oxygenated species.

Advantageously, the arrangement of the particle in which an outer shell of a metal material (such as platinum or predominantly platinum material) at least partially surrounds an inner core of an alloy material, may allow the particle to be suitable for many platinum-based particle systems exhibiting catalytic activities.

Advantageously, the core-shell arrangement may enable control in the composition of the particle. For example, the shell and the core may be formed of different materials or one may be formed of different combinations of material as desired. In addition, with the core-shell arrangement, the core size and shell thickness of the particle may be varied to optimise catalytic activity and stability of the particle.

Advantageously, the particle exhibiting catalytic activity may be used to catalyse an ORR or a carbon-nitrogen coupling reaction.

It has been found in an embodiment where the particle comprises a platinum outer shell and an AuCu core, the particle exhibits superior electrocatalytic activity and excellent stability towards ORR. The gold component in the AuCu alloy core may be crucial towards stabilising the platinum outer shell during ORR. The high electrocatalytic activity of the particle may be due to the compressive strain effect exerted by the AuCu alloy core on the platinum outer shell, which is induced by the slightly smaller lattice parameter of the AuCu core as compared to that of the platinum outer shell. In addition, the use of an AuCu core may substantially reduce the platinum loading in the resulting particle, hence leading to costs savings.

According to a second aspect, there is provided a method of forming a particle exhibiting catalytic activity comprising the steps of i) forming an inner core of the particle exhibiting catalytic activity, the inner core comprising an alloy material, and ii) forming an outer shell of the particle exhibiting catalytic activity on the inner core, the outer shell comprising a metal material.

According to a third aspect, there is provided a catalyst comprising a plurality of particles exhibiting catalytic activity, each particle comprising (a) an inner core formed of an alloy material; and (b) an outer shell formed of a metal material surrounding the inner core; wherein the alloy material is selected such that the inner core exerts a compressive strain on the outer shell.

According to a fourth aspect, there is provided an oxygen reduction reaction catalyst comprising a plurality of particles exhibiting catalytic activity, each particle comprising (a) an inner core formed of an alloy material; and (b) an outer shell formed of a metal material surrounding the inner core; wherein the alloy material is selected such that the inner core exerts a compressive strain on the outer shell.

According to a fifth aspect, there is provided a carbon-nitrogen coupling reaction catalyst comprising a plurality of particles exhibiting catalytic activity, each particle comprising (a) an inner core formed of an alloy material; and (b) an outer shell formed of a metal material surrounding the inner core; wherein the alloy material is selected such that the inner core exerts a compressive strain on the outer shell.

DEFINITIONS

The following words and terms used herein shall have the meaning indicated:

The term "alloy material" is to be interpreted broadly to refer to a material which is a combination of two or more metallic elements in one or more metallic phases.

The term "lattice parameter" is to be interpreted broadly to refer to the distance between atoms of a unit cell. The term "lattice parameter" is used interchangeably with the term "lattice constant".

The term "lattice strain", when referring to a layer of material, is to be interpreted broadly to refer to strain of the crystal lattice in directions at least substantially parallel to the plane of the layer of material. Lattice strain can be compressive strain or tensile strain. When the crystal lattice is strained, the crystal lattice is deformed from the normal lattice parameter for such a material so that the lattice parameter (in the strained state) would be different than what would normally be the case for such a material in a homogeneous relaxed crystal.

The term "compressive strain" is to be interpreted broadly to refer to a strain that results from compressive force caused by the difference between the lattice parameters of an inner layer (such as the inner core) and the corresponding outer layer (such as the outer shell). The compressive strain is caused when the in-plane lattice parameter of the metal material making up the outer layer in an unstrained state is larger than the in-plane lattice parameter of the alloy material making up the inner core in an unstrained state.

The term "tensile strain" is to be interpreted broadly to refer to a strain that results from tensile force caused by the difference between the lattice parameters of an inner layer (such as the inner core) and the corresponding outer layer (such as the outer shell). The tensile strain is caused when the in-plane lattice parameter of the metal material making up the outer layer in an unstrained state is smaller than the in-plane lattice parameter of the alloy material making up the inner core in an unstrained state.

The term "nano-sized" is to be interpreted broadly to define a size range which is less than about 1000 nm, particularly less than about 200 nm, or more particularly between about 1 nm to about 100 nm.

The term "nanoparticle" is to be interpreted broadly to refer to a particle which has a dimension in the nano-size range, or less than about 1000 nm, particularly less than about 200 nm, or more particularly between about 1 nm to about 100 nm. Where the nanoparticle is not a spherical particle, the above dimension may refer to the dimension of an equivalent spherical particle. Hence, the dimension may refer to the diameter of the nanoparticle (or equivalent spherical particle thereof).

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3; 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a particle exhibiting catalytic activity will now be disclosed.

The particle exhibiting catalytic activity may comprise (a) an inner core formed of an alloy material; and (b) an outer shell formed of a metal material surrounding the inner core, wherein the alloy material is selected such that the inner core exerts a compressive strain on the outer shell.

The compressive strain may cause a change in the electronic band, or surface, structure of the outer shell of the particle, resulting in weakened chemisorption of oxygenated species.

In order for the inner core to exert a compressive strain on the outer shell, the lattice parameter of the alloy material is smaller than the lattice parameter of the metal material. The lattice parameter of the alloy material ($LP_{am}$) may be smaller than the lattice parameter of the metal material ($LP_{mm}$) by a percentage value in the range which is more than zero but less than 5% (less than 4%, less than 3%, less than 2%, or less than 1%), whereby the percentages are calculated using the following equation:

$$\frac{LPmm - LPam}{LPmm} \times 100\%.$$

Due to the compressive strain exerted on the outer shell, it has been found that the metal material has a slightly higher binding energy (as compared to metal material in the native state). Where platinum is used as the metal material, the d band centers are lowered and the associated general reduction in the adsorption strengths could inhibit oxygen adsorption, but facilitate the rate-limiting step of ORR, that is, the removal of surface hydroxyl groups on the platinum shell, thus improving the ORR activity and hence increasing the catalytic activity of the particle. Conversely, if the lattice parameter of the alloy material is larger than that of the metal material, tensile strain is exerted on the outer shell instead. Here, the d band centers of platinum shift upwards with an increase in the adsorption strength, thereby hampering the removal of the surface hydroxyl groups and decreasing the ORR activity, leading to a decrease in the catalytic activity.

The alloy material or the metal material may have a lattice type independently selected from the group consisting of a hexagonal, triangular and cubic structure.

The ORR mechanism on platinum can be demonstrated by either the dissociative mechanism (for low current density range) or the associative mechanism (for high current density range). (* denotes a site on the platinum surface).

The dissociative mechanism is as shown in Scheme 1 below in which on a platinum surface, $O_2$ adsorption breaks the O—O bond and forms adsorbed atomic O, which further gains two electrons in the two consecutive steps, forming water.

½$O_2$+*→O*

O*+H$^+$+$e$→OH*

OH*+H$^+$+$e$→$H_2O$+*  Scheme 1

The associative mechanism is as shown in Scheme 2 below:

$O_2$+*→$O_2$*

$O_2$*+H$^+$+$e$→H$O_2$*

H$O_2$*+H$^+$+$e$→$H_2O$+O*

O*+H$^+$+$e$→OH*

OH*+H$^+$+$e$→$H_2O$+*  Scheme 2

Hence, by having a smaller lattice parameter of the alloy material as compared to that of the metal material, the removal of surface hydroxyl groups (or OH*) on the outer shell can be facilitated, leading to an improvement in the ORR activity.

The metal material forming the outer shell of the particle may comprise a transition metal or alloy thereof. The transition metal may be selected from the group consisting of platinum (Pt), palladium (Pd), ruthenium (Ru), rhodium (Rh), iridium (Ir) and osmium (Os). The metal material forming the outer shell of the particle may be platinum or predominantly platinum material.

The arrangement of the particle as disclosed with the outer shell and inner core formed of a metal and an alloy material, respectively, may be suited to many platinum-based particle systems exhibiting catalytic activities.

The alloy material forming the inner core of the particle may be an alloy formed of a combination of transition metals selected from the group consisting of gold (Au), silver (Ag), copper (Cu), nickel (Ni), zinc (Zn), cobalt (Co) iron (Fe), platinum (Pt), palladium (Pd), ruthenium (Ru), rhodium (Rh), iridium (Ir) and osmium (Os). The combination of transition metals in the alloy may be a binary, ternary or a higher combination. The alloy material forming the inner core may be gold together with one or more of the remaining transition metals recited in the list above. The alloy material may be an alloy formed of gold (Au) and copper (Cu). Accordingly, the alloy material is an AuCu alloy. The presence of the copper in the AuCu alloy may decrease the lattice parameter of the AuCu alloy (as compared to the lattice parameter of pure Au). This is due to the smaller lattice parameter which results in a decrease in the lattice parameter of the resultant AuCu alloy. The presence of the gold may aid in stabilizing the outer shell, for example, during oxygen reduction reaction.

In one embodiment, the particle having catalytic activity comprises an outer shell formed of platinum or predominantly platinum metal material, and an inner core formed of an AuCu alloy. Hence, this particle may be termed herein as an AuCu@Pt particle. Due to the inner core being AuCu alloy, a lesser amount of platinum is required for the particle, leading to a substantial decrease in platinum loading, while not affecting the catalytic activity and stability of the particle.

Here, the particle may have enhanced catalytic activity in the form of enhanced electrocatalytic activity.

The core-shell arrangement of the particle may enable control in the composition of the particle. The shell and the core may be formed of different materials or one may be formed of different combinations of material as desired. Further, with the core-shell arrangement, the core size and shell thickness of the particle may be varied to optimise catalytic activity and stability of the particle.

The wt % of the metal material (or metal material loading) in the particle may be selected from the range of about 1 wt % to about 30 wt %, about 1 wt % to about 5 wt %, about 1 wt % to about 10 wt %, about 1 wt % to about 20 wt %, about 5 wt % to about 30 wt %, about 10 wt % to about 30 wt % or about 20 wt % to about 30 wt %. In one embodiment, the wt % of the metal material in the particle may be about 10 wt %. The wt % of the metal material may determine the thickness of the outer shell.

The particle may have a shape such as spherical, ellipsoid, wire-like, rod-like, sheet-like, flake-like or an irregular shape.

The size of the particle is not particularly limited and may be in the range selected from about 1 nm to about 1 μm to about 100 nm, about 1 nm to about 50 nm, about 2 nm to about 40 nm, about 3 nm to about 30 nm, about 3 nm to about 20 nm, about 3 nm to about 10 nm, about 3 nm to about 5 nm, about 4 nm to about 7 nm, about 4 nm to about 9 nm, about 4 nm to about 11 nm, about 4 nm to about 13 nm, about 4 nm to about 15 nm, about 4 nm to about 17 nm or about 4 nm to about 19 nm. The particle may be in the nano size range and the particle may be referred to as a nanoparticle.

The thickness of the inner core may be in the range of about 1 nm to about 100 nm, about 1 nm to about 50 nm, about 2 nm to about 40 nm, about 3 nm to about 30 nm, about 3 nm to about 20 nm, about 3 nm to about 15 nm, about 3 nm to about 13 nm, about 3 nm to about 11 nm, about 3 nm to about 9 nm, about 3 nm to about 7 nm, about 3 nm to about 5 nm, about 4 nm to about 6 nm, about 4 nm to about 8 nm, about 4 nm to about 10 nm, about 4 nm to about 12 nm or about 4 nm to about 14 nm.

The thickness of the shell may be in the range of about one to twenty atomic layers of the metallic atoms. The shell thickness may be in the range selected from 1 to 20, 1 to 18, 1 to 16, 1 to 14, 1 to 12, 1 to 10, 1 to 8, 1 to 6, 1 to 4, 1 to 2, 2 to 3, 2 to 5, 2 to 7, 2 to 9, 2 to 11, 2 to 13, 2 to 15, 2 to 17, 2 to 19, 20, 15, 10, 9, 8, 7, 6, 5, 4, 3, 2 or 1 atomic layer(s) of the metal material. The thickness of the outer shell may affect the catalytic activity and/or stability of the particle, when used as a catalyst.

The thickness of the shell may be in the range selected from about 0.1 nm to about 5 nm, about 0.1 nm to about 1 nm, about 0.1 nm to about 2 nm, about 0.1 nm to about 3 nm, about 0.1 nm to about 4 nm, about 1 nm to about 5 nm, about 2 nm to about 5 nm, about 3 nm to about 5 nm, about 4 nm to about 5 nm. The thickness of the shell may be less than about 3 nm.

The ratio of core/shell (measured in terms of average diameter, for example) may be about 1:100, about 1:50, about 1:10, about 1:9, about 1:8, about 1:7, about 1:6, about 1:5, about 1:4, about 1:3, about 1:2 or about 1:1. Preferably, the ratio of core/shell may be in the range of about 1:1 to about 1:10, or in the range of about 1:1 to about 1:5.

The particle exhibiting catalytic activity may be used to catalyse an oxygen reduction reaction (ORR).

There is also provided a method of synthesizing a particle exhibiting catalytic activity. The method may comprise the steps of i) forming an inner core of the particle exhibiting catalytic activity, the inner core formed of an alloy material, and ii) forming an outer shell of the particle exhibiting catalytic activity on the preformed inner core, the outer shell formed of a metal material.

The step i) of the above method may comprise a pre-step of forming a particle of one of the transition metals (or "first transition metal") constituting the alloy material of the inner core. The particle of the first transition metal formed in the pre-step may be used as a seed particle to stimulate the formation of the inner core in the form of an alloy. Hence, a pre-cursor of a second transition metal may be added to the seed particle in order to form the inner core.

The above method may be a simple, one-pot synthesis to form the particle. As such, the reactants may be provided in a reactor (or reaction zone) and the product (the AuCu@Pt nanoparticles) may be obtained directly from the reactor (or reaction zone) without any need to isolate or separate the intermediate (the AuCu inner core) from the reaction. The intermediate can be used in situ to form the AuCu@Pt nanoparticles.

The method may comprise the step of adding a pre-cursor of the metal material into the reactor (or reaction zone). The reactor (or reaction zone) may be the same reactor (or reaction zone) as that used to form the inner core (hence the method can be termed as a "one-pot" method to synthesize the particle) or the reactor (or reaction zone) may be a different reactor (or reaction zone) than that used to form the inner core.

The pre-cursor of the metal material may be reduced to enable deposition of the metal material on the preformed inner core, thereby completing the formation of the particle.

The pre-step of forming a particle of the first transition metal may be carried out at a temperature selected from the range of about 80° C. to about 180° C., about 80° C. to about 170° C., about 80° C. to about 160° C., about 80° C. to about 150° C., about 80° C. to about 140° C., about 80° C. to about 130° C., about 80° C. to about 120° C., about 80° C. to about 110° C., about 80° C. to about 100° C., about 100° C. to about 110° C., about 100° C. to about 120° C., about 100° C. to about 130° C., about 100° C. to about 140° C., about 100° C. to about 150° C., about 100° C. to about 160° C., about 100° C. to about 180° C., about 110° C. to about 170° C., about 120° C. to about 160° C. or about 130° C. to about 150° C.

The step of forming the inner core may be carried out at a temperature selected from the range of about 260° C. to about 340° C., about 260° C. to about 330° C., about 260° C. to about 320° C., about 260° C. to about 310° C., about 260° C. to about 300° C., about 260° C. to about 290° C., about 260° C. to about 280° C., about 280° C. to about 290° C., about 280° C. to, about 300° C., about 280° C. to about 310° C., about 280° C. to about 320° C., about 280° C. to about 330° C., about 280° C. to about 340° C., about 290° C. to about 340° C., about 290° C. to about 320° C., or about 290° C. to about 310° C.

The step of forming the outer shell on the inner core to thereby synthesize the particle may be carried out at a temperature selected from the range of about 80° C. to about 260° C., about 80° C. to about 240° C., about 80° C. to about 220° C., about 80° C. to about 200° C., about 80° C. to about 160° C., about 80° C. to about 140° C., about 80° C. to about 120° C., about 80° C. to about 100° C., about 100° C. to about 120° C., about 100° C. to about 140° C., about 100° C. to about 160° C., about 100° C. to about 180° C., about 100° C. to about 200° C., about 100° C. to about 220° C., about 100° C. to about 240° C., about 100° C. to about 260° C., about 120° C. to about 240° C., about 140° C. to about 220° C. or about 160° C. to about 200° C.

In an embodiment where the first transition metal is gold, the pre-step of forming the gold particles may be carried out at a temperature selected from the range of about 100° C. to about 160° C. Then, the gold particle may be used as a seed particle to stimulate the formation of AuCu alloy material and thereby form the inner core at a temperature selected from the range of about 280° C. to about 320° C. Following which, a pre-cursor of platinum or predominantly platinum material may be added to the inner core to form an outer shell of platinum at a temperature selected from the range of about 100° C. to about 240° C.

An organic solvent may be used in step i) of the method. The organic solvent may be an amine-based organic solvent. The amine-based organic solvent may be oleyamine. For example, the oleyamine may be used in the embodiment disclosed above having a Pt or predominantly Pt outer shell over an AuCu inner core. In another embodiment, a different organic solvent or different amine-based organic solvent may be used depending on the synthesis conditions, reactants used and product to be formed. Advantageously, oleyamine may play multiple roles as a solvent, a reducing agent and a shape-controlling agent.

There is also provided a catalyst comprising a plurality of particles exhibiting catalytic activity, each particle comprising (a) an inner core formed of an alloy material; and (b) an outer shell formed of a metal material surrounding the inner core, wherein the alloy material is selected such that the inner core exerts a compressive strain on the outer shell.

Each particle may further comprise a reference or supporting material, such as a carbon material.

The catalyst may be used to catalyse an oxygen reduction reaction.

The catalyst may have increased catalytic activity as compared to another catalyst that is purely platinum. The catalyst may have more than 1 time, more than 2 times, more than 3 times, more than 4 times, more than 5 times, more than 6 times, or more than 7 times the catalytic activity as compared to the purely platinum catalyst.

The catalyst may have enhanced stability as compared to a purely platinum catalyst. For example, the stability of the catalyst may be measured by its half-wave potential before and after a certain number of cycles. The half-wave potential may be essentially unchanged after a number of cycles, while the half-wave potential of the purely platinum catalyst may decrease after the same number of cycles. Hence, the catalyst may be more stable than the purely platinum catalyst. The stability of the catalyst can also be determined by comparing the particle size and morphology before and after the above stability test. The catalyst may be stable in which the particle size and morphology after the stability test remain essentially similar to those before the stability test.

There is also provided an oxygen reduction reaction catalyst comprising a plurality of particles exhibiting catalytic activity, each particle comprising (a) an inner core formed of an alloy material; and (b) an outer shell formed of a metal material surrounding the inner core, wherein the alloy material is selected such that the inner core exerts a compressive strain on the outer shell.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

EXAMPLES

Non-limiting examples of the invention and a comparative example will be further described in greater detail by reference to specific Examples, which should not be construed as in any way limiting the scope of the invention.

Example 1

Synthesis of AuCu@Pt Nanoparticles

Figure 1:
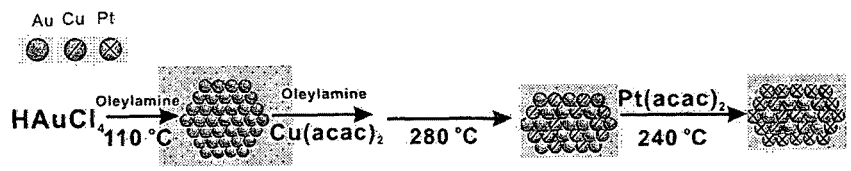
FIG. 1 is a schematic diagram showing the seed-mediated growth synthesis of core-shell AuCu@Pt nanoparticles.

In order to synthesize the AuCu@Pt nanoparticles, the process of FIG. 1 was followed.

Au nanoparticles were synthesized by heating a solution of 93 mg of tetrachloroaurate trihydrate (HAuCl$_4$.3H$_2$O, 99.9%, obtained from Sigma-Aldrich of Missouri of the United States of America) in 10 mL of oleylamine (technical grade, 70%, obtained from Sigma-Aldrich of Missouri of the United States of America) at 110° C. in a nitrogen atmosphere under magnetic stirring for 4 hours.

The synthesized Au nanoparticles were then used as seeds for the formation of AuCu. Here, 60 mg of copper (II) acetylacetonate ($Cu(acac)_2$, 99%, obtained from Sigma-Aldrich of Missouri of the United States of America) was immediately added to the Au nanoparticle solution (10 ml), and the mixture was heated at 280° C. for 1 hour under nitrogen flow with rapid magnetic stirring.

For the synthesis of core-shell AuCu@Pt nanoparticles, 30 mg of platinum (II) acetylacetonate ($Pt(acac)_2$, 97%, obtained from Sigma-Aldrich of Missouri of the United States of America) was immediately added to the AuCu alloy solution, and the mixture was kept at 240° C. for hour under nitrogen flow with magnetic stirring. The subsequent reduction of Pt (II) precursors resulted in the homogeneous deposition of Pt on the preformed AuCu alloy nanoparticles. The resulting core-shell nanoparticles were then cooled to room temperature (about 25° C. to 30° C.), precipitated by methanol (98%, obtained from Sigma-Aldrich of Missouri of the United States of America), washed twice with methanol to remove the free ligand and followed by re-dispersion in hexane (99%, obtained from Sigma-Aldrich of Missouri of the United States of America).

The AuCu@Pt nanoparticles were characterized by transmission electron microscopy (TEM), high-resolution TEM (HRTEM) and high-angle annular dark-field scanning transmission electron microscopy (HAADF-STEM) (FEI Tecnai $G^2$ F20 electron microscope by FEI of Oregon of the United States of America). Samples for TEM studies were prepared by putting a droplet of the nanoparticles solution on a copper grid coated with a thin carbon film, followed by evaporation in air at room temperature. The catalyst composition was determined in situ by an energy dispersive X-ray (EDX) attachment to the microscope.

Figure 2:
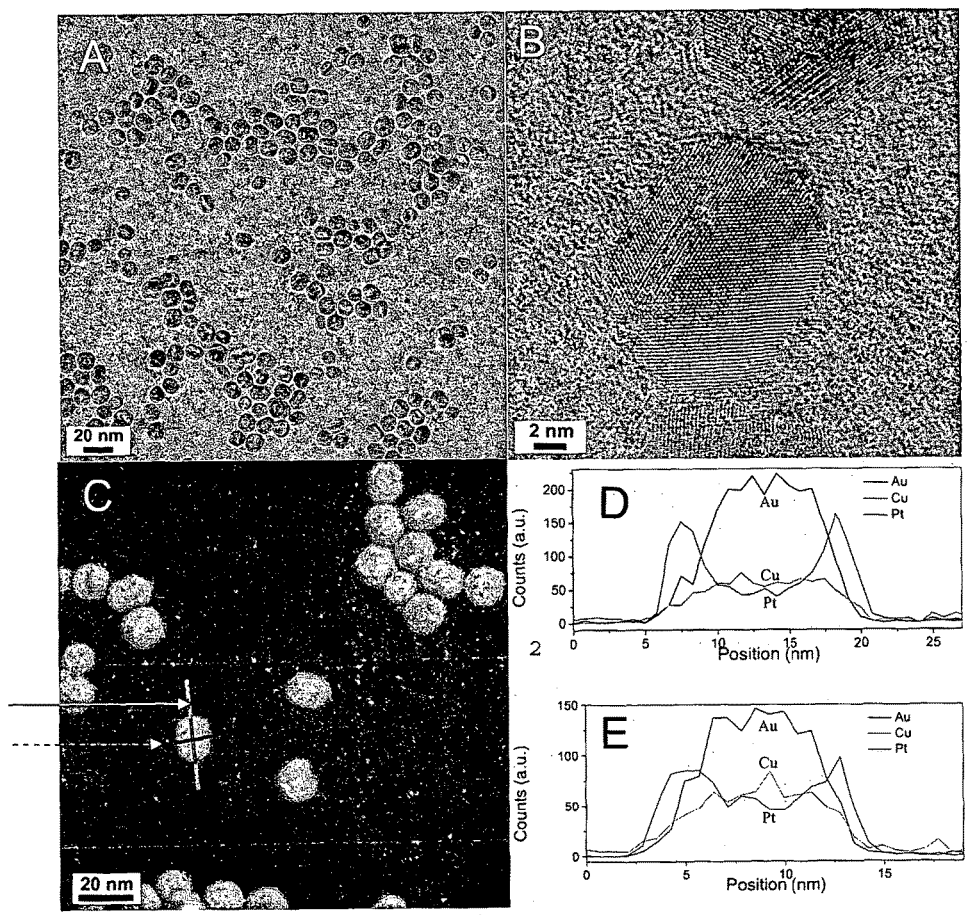
FIG. 2a is a transmission electron microscopy (TEM) image of the AuCu@Pt nanoparticles.
FIG. 2b is a high-resolution TEM (HRTEM) image of the AuCu@Pt nanoparticles.
FIG. 2c is a high-angle annular dark-field scanning transmission electron microscopy (HAADF-STEM) image of the AuCu@Pt nanoparticles.
FIG. 2d is a graph showing the Au, Cu and Pt elemental profiles along the line across the AuCu@Pt nanoparticle depicted by the arrow (→) in FIG. 2c.
FIG. 2e is a graph showing the Au, Cu and Pt elemental profiles along the line across the AuCu@Pt nanoparticle depicted by the arrow (- - -▶) in FIG. 2c.

The core-shell AuCu@Pt nanoparticles averaged about 15.3 nm in length and about 12.5 nm in diameter (FIG. 2a). The core-shell AuCu@Pt nanoparticles predominantly have a rod-like morphology, as illustrated by the HRTEM image (FIG. 2b). Due to the similar lattice parameter of the AuCu alloy core and the Pt shell, it was difficult to accurately characterize these core-shell nanoparticles by HRTEM. However, the formation of core-shell AuCu@Pt nanoparticles could be confirmed by the elemental profiles of these particles in the HAADF-STEM images. Pt signal was detected across the entire particle, whereas Au and Cu signals were only obtained across the core (FIG. 2c to FIG. 2e). In addition, the alloy structure of AuCu is confirmed by FIG. 2d and FIG. 2e.

To load the catalyst on Vulcan XC-72 carbon support, mg of carbon (obtained from Cabot Corporation of Massachusetts of the United States of America) was added to the solution of AuCu@Pt nanoparticles. After stirring at room temperature for 24 hours, the AuCu@Pt/C catalysts (with 10 wt % of Pt loading) were collected via centrifugation, washed 3 times with methanol, and dried at room temperature in vacuum.

All glassware and Teflon-coated magnetic stir bars were cleaned with aqua regia, followed by copious rinsing with de-ionized water before drying in an oven. All chemicals used are as received.

Comparative Example 1

Synthesis of Au@Pt Nanoparticles

Au@Pt nanoparticles were also synthesized as comparative example 1. Here, a solution of 93 mg of $HAuCl_4 \cdot 3H_2O$ in 10 mL of oleylamine was heated at 110° C. in a nitrogen atmosphere under magnetic stirring for 4 h. These Au nanoparticles were then used as seeds for the formation of Au@Pt. 30 mg of $Pt(acac)_2$ was immediately added to the Au solution, and the mixture was kept at 240° C. for 1 hour under a nitrogen flow with magnetic stirring.

Figure 3:
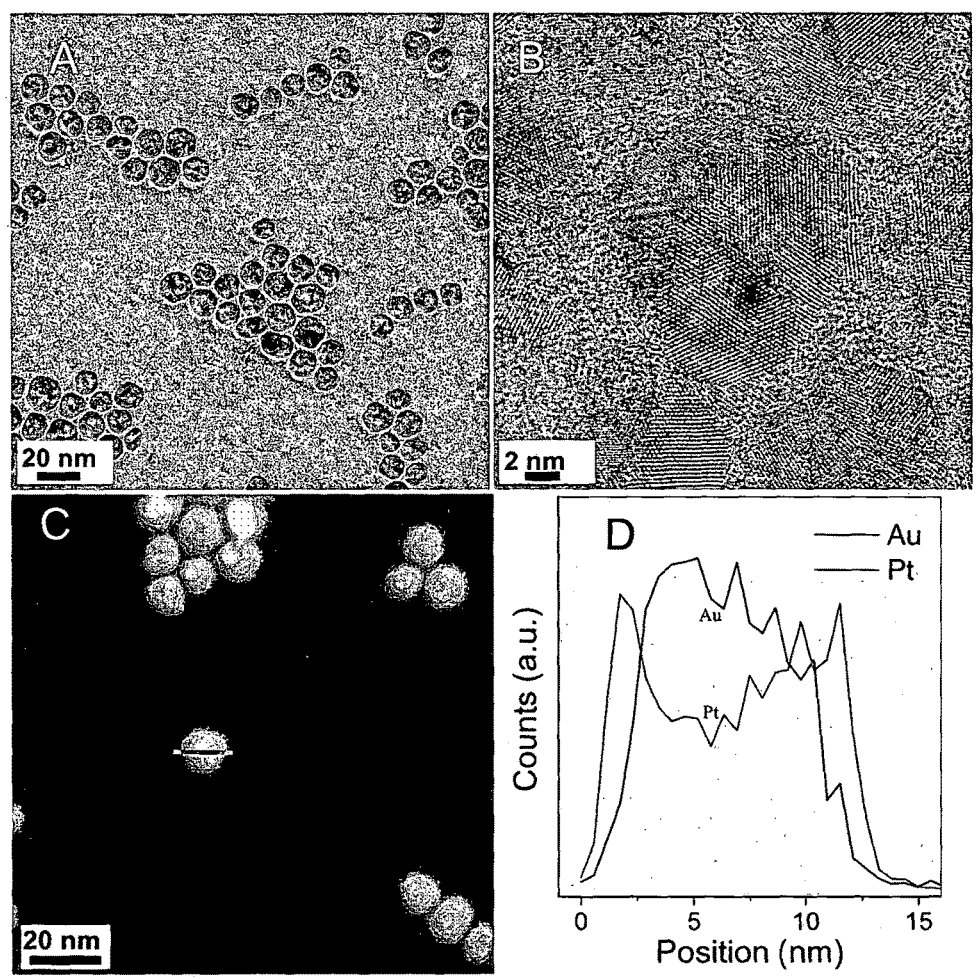
FIG. 3a is a TEM image of the Au@Pt nanoparticles.
FIG. 3b is a HRTEM image of the Au@Pt nanoparticles.
FIG. 3c is a HAADF-STEM image of the Au@Pt nanoparticles.
FIG. 3d is a figure showing the Au and Pt elemental profiles along the line across the Au@Pt nanoparticle in FIG. 3c.

The core-shell Au@Pt nanoparticles were also analyzed using TEM, HRTEM and HAADF-STEM. The Au@Pt nanoparticles have an average particle size of about 15 nm (FIG. 3a). The HRTEM image illustrated that the Au@Pt nanoparticles were predominantly multiply twinned with decahedral morphology (FIG. 3b). Similar to the AuCu@Pt nanoparticles, the core-shell structure of the Au@Pt nanoparticles was confirmed by the elemental profiles of a particle in the HAADF-STEM image (FIG. 3c and FIG. 3d).

Comparative Example 2

Pt/C Nanoparticles

Pt/C nanoparticles were obtained commercially from E-tek (of Sweden) and used as comparative example 2.

Example 2

X-ray Diffraction Analysis

X-ray diffraction (XRD) patterns were recorded on a Rigaku D/Max-3B diffractometer using Cu $K_\alpha$ radiation ($\lambda$=1.54056 Å). X-ray photoelectron spectroscopy (XPS) was conducted on an ESCALAB MKII spectrometer (VG Scientific) using Al $K_\alpha$ radiation (1486.71 eV). Samples for XRD and XPS measurements were precipitated from a hexane solution of the nanoparticles using methanol. The nanoparticles were recovered via centrifugation, washed with methanol several times to remove non-specifically bonded oleylamine, and then dried at room temperature in vacuum.

Figure 4:
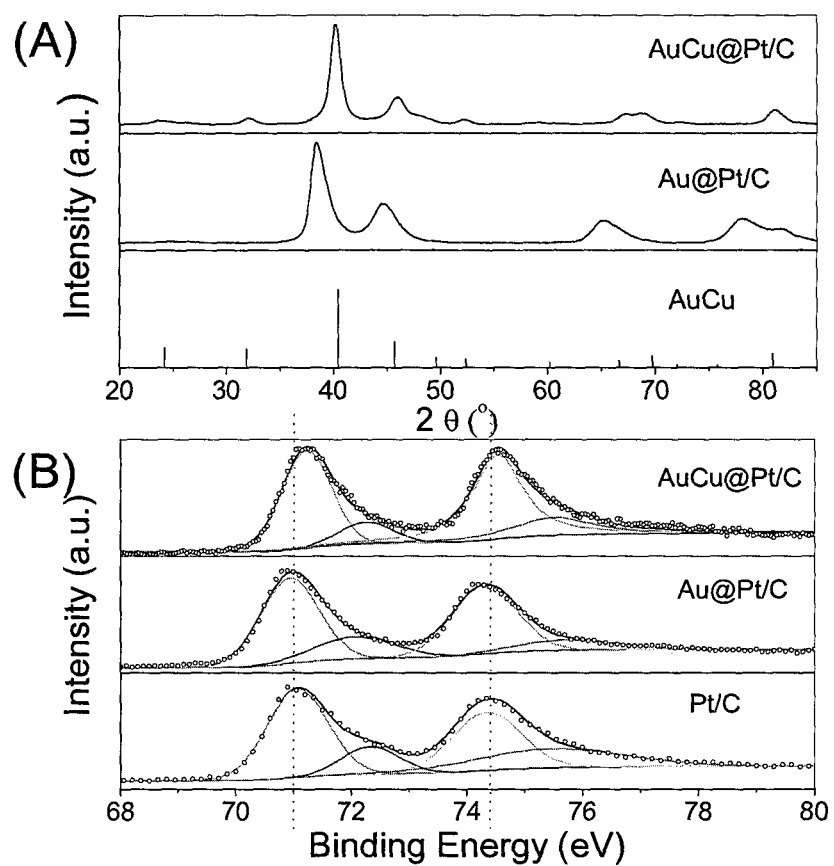
FIG. 4a shows the X-ray diffraction (XRD) patterns of AuCu reference (JCPDS 35-1357), Au@Pt/C and AuCu@Pt/C nanoparticles.
FIG. 4b shows the X-ray photoelectron spectroscopy (XPS) spectra of Pt/C, Au@Pt/C and AuCu@Pt/C.

The XRD diffraction patterns of AuCu@Pt/C are shown in FIG. 4a. AuCu@Pt/C and Au@Pt/C showed similar diffraction peaks as AuCu (JCPDS 35-1357) and Au (JCPDS 04-0784), respectively. This showed that the Pt shell in the core-shell nanoparticles was too thin to give rise to diffraction peaks. In addition, the alloy structure of AuCu can be seen from FIG. 4a. In order to understand the surface strain of the Pt shell in AuCu@Pt and Au@Pt nanoparticles, the nanoparticles were further characterized by XPS spectroscopy (FIG. 4b). The most intense doublet (at 71.2 and 74.6 eV) in the XPS patterns was characteristic of metallic Pt. The second and weaker doublet (at 72.3 and 75.9 eV) could be assigned to the oxidized Pt in the forms of PtO and $Pt(OH)_2$. For the AuCu@Pt/C nanoparticles, the Pt 4f signals shifted positively with respect to Pt/C due to the compressive surface strain induced by depositing a Pt layer with a larger lattice parameter of 0.392 nm over the AuCu core with a smaller lattice parameter of 0.387 nm. For the Au@Pt/C nanoparticles, the negative shifts in the Pt 4f signals with respect to Pt/C indicated tensile surface strain of the Pt shell on the Au core due to the larger lattice parameter (0.408 nm) of the latter.

Example 3

Catalytic Activities

Electrochemical measurements were conducted in a standard three-electrode cell. Pt gauze and Ag/AgCl (3 M KCl)

were used as the counter electrode and the reference electrode, respectively. The working electrode was a thin layer of catalyst-impregnated Nafion cast on a 5-mm glassy carbon disk. The catalyst ink was prepared by ultrasonically dispersing 10 mg of catalyst in a 10-mL aqueous solution containing 4 mL of isopropanol and 0.2 mL of 5 wt % Nafion solution. All potentials were converted to the reversible hydrogen electrode (RHE), and the currents were normalized as current densities by dividing with the surface area of the 5 mm-diameter electrode. Measurements of the ORR activities were conducted in 0.1 M $HClO_4$ electrolyte. Linear sweep voltammograms were recorded at 20 mV/s from 0 V to 1.0 V at room temperature. Sweep rate=20 mV/s; 1600 rpm; room temperature. Pt loading was 15 μg/$cm^2$ for Pt/C and Au@Pt/C, and 7.5 μg/$cm^2$ for AuCu@Pt/C.

Figure 5:
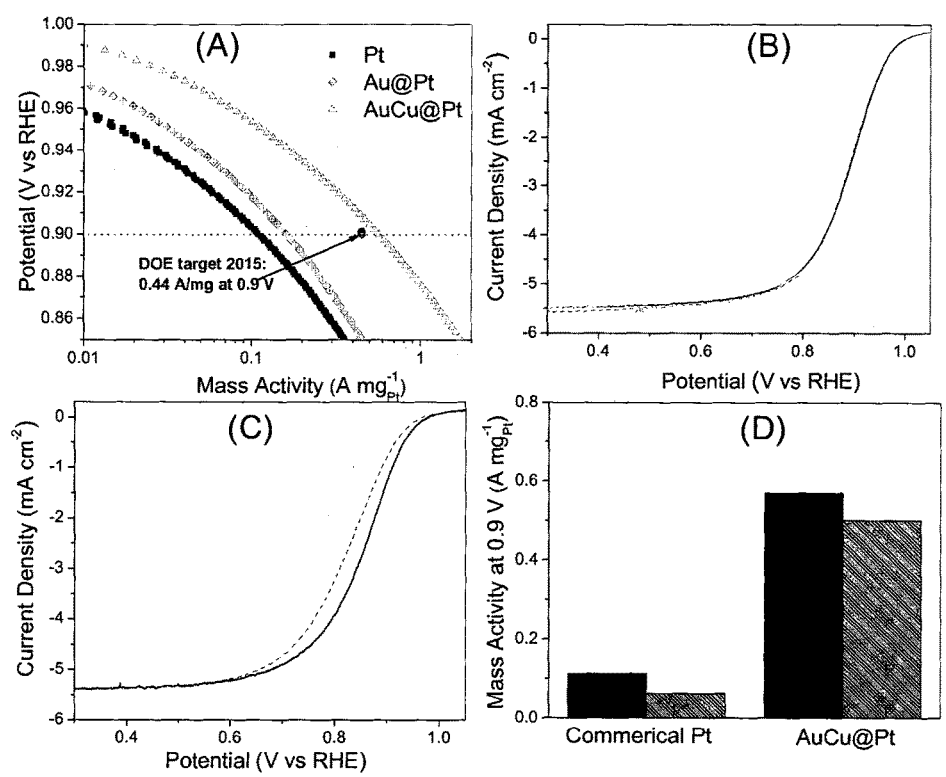
FIG. 5a shows the mass-normalized region of ORR measurement for Pt/C, Au@Pt/C and AuCu@Pt/C catalysts, showing the positive-going scans.
FIG. 5b is a graph showing the linear sweep voltammograms of AuCu@Pt/C before (-) and after (--) 30,000 cycles of stability testing.
FIG. 5c is a graph showing the linear sweep voltammograms of Pt/C catalysts before (-) and after (--) 30,000 cycles of stability testing.
FIG. 5d is a bar graph showing the kinetic mass activities of ORR over commercial Pt/C and AuCu@Pt/C before (■) and after (▨) 30,000 cycles of stability testing.

The catalytic activity of the core-shell AuCu@Pt/C nanoparticles towards ORR was evaluated by sweep voltammetry, and benchmarked against that of the Au@Pt/C and the commercial Pt/C nanoparticles. FIG. 5a shows the mass-normalized Tafel regions of Pt/C, Au@Pt/C and AuCu@Pt/C for the ORR in an $O_2$-saturated 0.1 M $HClO_4$ solution at room temperature. The catalytic activity of AuCu@Pt/C was superior to that of Au@Pt/C and the commercial Pt/C. Specifically, at 0.9 V, the mass catalytic activity of AuCu@Pt/C was 0.571 A/mg-Pt, which was more than 5 times higher than that of the commercial Pt/C (0.109 A/mg-Pt). This superb catalytic activity of AuCu@Pt/C exceeded the 2015 target of 0.44 A/mg-Pt set by the U.S. Department of Energy (DoE) at 0.9 V and 80° C.

The enhancement of ORR activity could be explained by the core-shell structure of the AuCu@Pt nanoparticles leading to lattice strain effect in catalysis. For the AuCu@Pt nanoparticles, the AuCu core has a slightly smaller lattice parameter (0.387 nm) than the Pt shell (0.392 nm), hence compressing the Pt atoms laterally in the shell as compared to their bulk form, resulting in a lowering of their d band centers. This phenomenon was experimentally confirmed by the XPS 4f spectra of AuCu@Pt nanoparticles, whereby the Pt binding energy was slightly higher than that of the commercial Pt nanoparticles due to the compressive strain (FIG. 4b). The down-shifts of the d-band centers and the associated general reduction in the adsorption strengths could inhibit oxygen adsorption, but facilitate the rate-limiting step of ORR, that is, the removal of surface OH groups on the Pt shell in AuCu@Pt, thus improving the ORR activity. In contrast, the catalytic activity of the core-shell Au@Pt nanoparticles towards ORR was found to be much lower than that of the core-shell AuCu@Pt nanoparticles because Au has a much larger lattice parameter than Pt (0.408 nm vs. 0.392 nm). Consequently, tensile surface strain was induced when Pt was deposited on the Au core, causing up-shifts of the d-band center of Pt and increasing the adsorption strength, thereby hampering the removal of the OH groups and decreasing the ORR activity.

Example 4

Stability Testing

The stabilities of the AuCu@Pt/C and commercial Pt/C catalysts were evaluated in an accelerated stability test by continuously cycling potential between 0.6 V and 1.1 V at a scan rate of 50 mV/s in an oxygen-saturated 0.1 M $HClO_4$ solution at room temperature for 30000 cycles.

The kinetic mass activities of the AuCu@Pt/C and commercial Pt/C catalysts were calculated from Koutecký-Levich equation before and after potential cycling.

For the AuCu@Pt/C catalyst, the half-wave potential was essentially unchanged after 30000 cycles (FIG. 5b), illustrating its excellent stability. In contrast, the half-wave potential of the commercial Pt/C catalyst degraded by about 31 mV after 30000 cycles (FIG. 5c). More specifically, the AuCu@Pt/C catalyst showed a decrease in kinetic mass activity of only 12% (from 0.57 to 0.50 A/mg-Pt), which was significantly less than the 45% loss in activity by commercial Pt/C catalyst (which decreased from 0.11 to 0.06 A/mg-Pt) (FIG. 5d).

Figure 6:
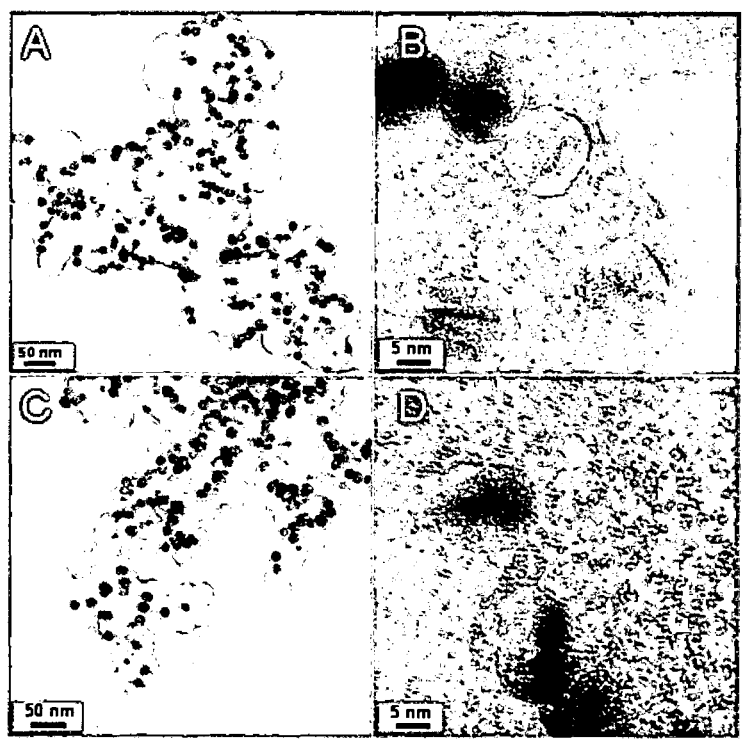
FIG. 6a is a TEM image of AuCu@Pt/C catalysts before stability testing.
FIG. 6b is a HRTEM image of AuCu@Pt/C catalysts before stability testing.
FIG. 6c is a TEM image of AuCu@Pt/C catalysts after 30,000 cycles of stability testing.
FIG. 6d is a HRTEM image of AuCu@Pt/C catalysts after 30,000 cycles of stability testing.

When Pt was bonded to Au, there was a significant coupling of d orbitals between Pt and Au, which would modify the Pt electronic structure to the lower-lying d band states. An equivalent type of interaction between Au and Pt would account for the observed stabilization of Pt. The excellent stability of the AuCu@Pt/C catalyst was also confirmed by the TEM images obtained before (FIG. 6a) and after (FIG. 6c) 30000 cycles as well as by the HRTEM images obtained before (FIG. 6b) and after (FIG. 6d) 30000 cycles. The AuCu@Pt nanoparticles were well-dispersed on XC-72, and maintained their original particle size and morphology after the stability test.

Example 5

Effect of Shell Thickness

Figure 7:
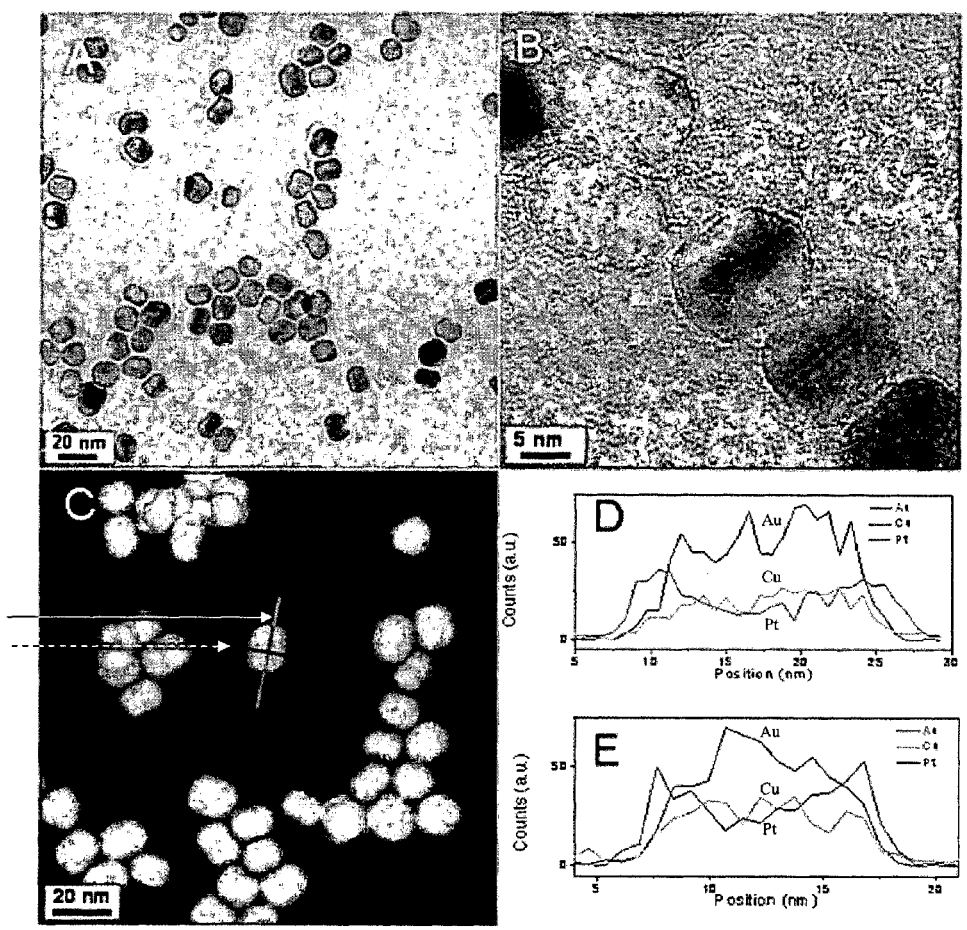
FIG. 7a is a TEM image of the AuCu@Pt-2 nanoparticles.
FIG. 7b is a HRTEM image of the AuCu@Pt-2 nanoparticles.
FIG. 7c is a HAADF-STEM image of the AuCu@Pt-2 nanoparticles.
FIG. 7d is a graph showing the Au, Cu and Pt elemental profiles along the line across a AuCu@Pt-2 nanoparticle depicted by the arrow (→) in FIG. 7c.
FIG. 7e is a graph showing the Au, Cu and Pt elemental profiles along the line across a AuCu@Pt-2 nanoparticle depicted by the arrow (- - -▶) in FIG. 7c.

The effect of Pt shell thickness on the activity and stability of the AuCu@Pt core-shell catalysts was also investigated. By decreasing the Pt precursor by half during synthesis (in which 15 mg of Pt(acac)$_2$ was added to the AuCu seed solution instead of 30 mg Pt(acac)$_2$ as described in Example 1), nanoparticles designated as AuCu@Pt-2 (5 wt % Pt loading), which were about 15.0 nm in length and about 12.1 nm in diameter (FIG. 7a and FIG. 7b) were obtained. The core-shell structure was confirmed by the elemental profiles of a particle in the HAADF-STEM image (FIG. 7c, FIG. 7d and FIG. 7e).

Figure 8:
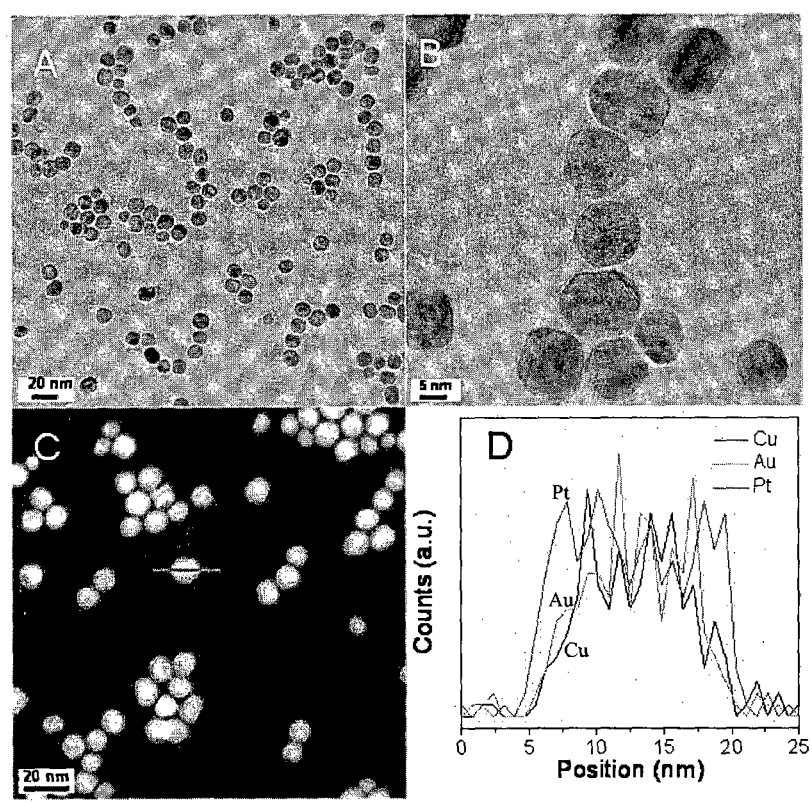
FIG. 8a is a TEM image of the AuCu@Pt-3 nanoparticles.
FIG. 8b is a HRTEM image of the AuCu@Pt-3 nanoparticles.
FIG. 8c is a HAADF-STEM image of the AuCu@Pt-3 nanoparticles.
FIG. 8d is a graph showing the Cu, Au and Pt elemental profiles along the line across a single AuCu@Pt-3 nanoparticle shown in FIG. 8c.

Similarly, AuCu@Pt-3 nanoparticles (20 wt % Pt loading) with a thicker Pt shell were synthesized by increasing the Pt precursor during synthesis (in which 65 mg of Pt(acac)$_2$ was added to the AuCu seed solution instead of 30 mg Pt(acac)$_2$ as described in Example 1). The AuCu@Pt-nanoparticles were about 15.5 nm in length and about 13.0 nm in diameter (FIG. 8a and FIG. 8b). The core-shell structure was confirmed by the elemental profiles of a particle in the HAADF-STEM image (FIG. 8c and FIG. 8d).

Figure 9:
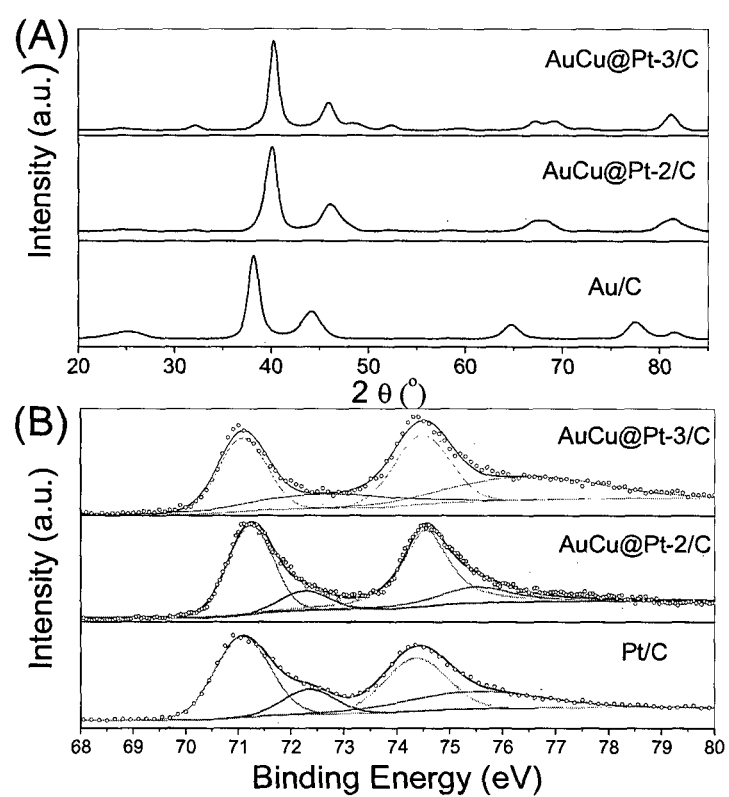
FIG. 9a shows the XRD patterns of Au/C, AuCu@Pt-2/C and AuCu@Pt-3/C.
FIG. 9b shows the XPS spectra of Pt/C, AuCu@Pt-2/C and AuCu@Pt-3/C.

The XRD diffraction patterns and XPS patterns of the AuCu@Pt-2 nanoparticles and AuCu@Pt-3 nanoparticles are shown in FIG. 9a and FIG. 9b respectively.

Figure 10:
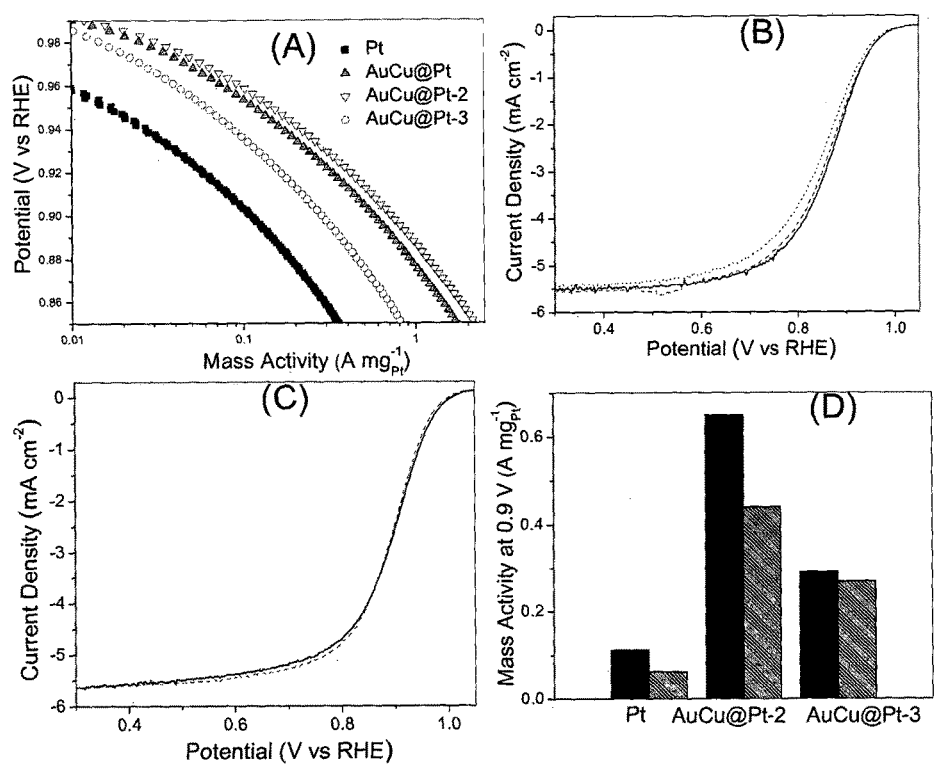
FIG. 10a shows the mass-normalized Tafel regions of ORR over Pt/C, AuCu@Pt/C, AuCu@Pt-2/C and AuCu@Pt-3/C.
FIG. 10b is a graph showing the linear sweep voltammograms of AuCu@Pt-2/C catalysts in oxygen-saturated 0.1 M HClO$_4$ before (-), and after (--) 10,000 and (------) 30,000 cycles of stability testing.
FIG. 10c is a graph showing the linear sweep voltammograms of AuCu@Pt-3/C catalysts before (-) and after (--) 30,000 cycles of stability testing.
FIG. 10d is a bar graph showing the kinetic mass activities of ORR over Pt/C, AuCu@Pt-2/C and AuCu@Pt-3/C before (■) and after (▨) 30,000 cycles of stability testing.
Figure 11:
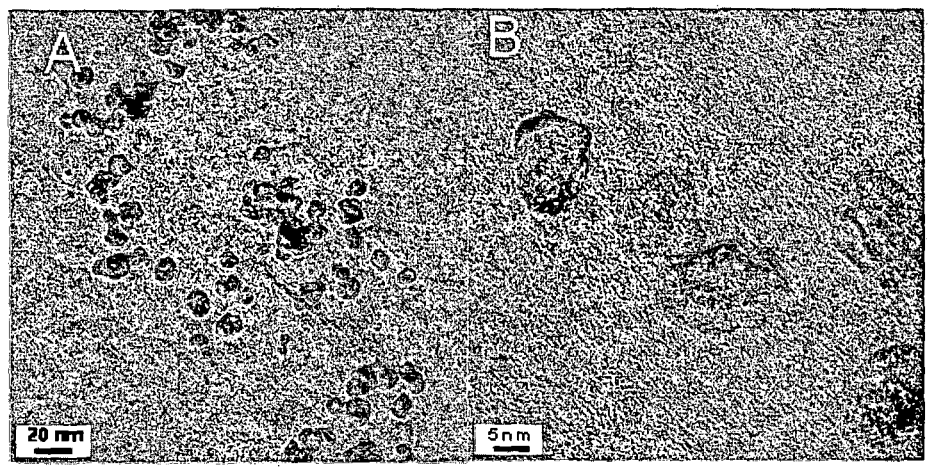
FIG. 11a is a TEM image of AuCu@Pt-2 nanoparticles supported on XC-72 carbon after 30,000 cycles of stability testing.
FIG. 11b is a HRTEM image of AuCu@Pt-2 nanoparticles supported on XC-72 carbon after 30,000 cycles of stability testing.

The catalytic activities of the AuCu@Pt-2 nanoparticles and AuCu@Pt-3 nanoparticles (following the procedure in Example 3 above) were investigated. The mass-normalized Tafel regions of ORR in FIG. 10a show that the AuCu@Pt-2/C catalyst has superior electrocatalytic activity to AuCu@Pt/C, AuCu@Pt-3/C and commercial Pt/C catalysts. This could be due to AuCu@Pt-2 nanoparticles having the thinnest Pt shell, thereby imposing the greatest compressive strain on the AuCu core. However, the half-wave potential of the AuCu@Pt-2/C catalyst degraded by 7 mV and 22 mV after 10,000 and 300,000 cycles (FIG. 10b), respectively, accounting for 32% loss in the kinetic mass activity (FIG. 10d). This poor stability was also illustrated by the TEM images taken after 30,000 potential cycles, which showed that most of the AuCu@Pt-2 nanoparticles were broken and could not keep their original morphology (FIG. 11a and FIG. 11a).

Figure 12:
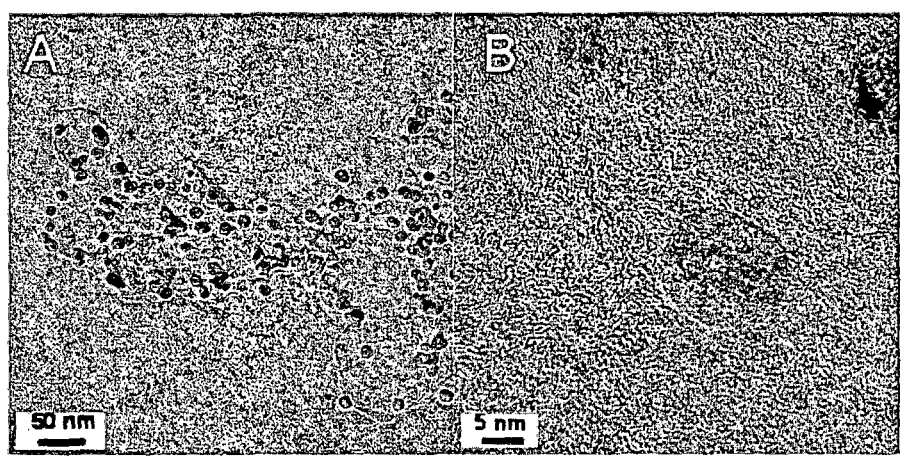
FIG. 12a is a TEM image of AuCu@Pt-3 nanoparticles supported on XC-72 carbon after 30,000 cycles of stability testing.
FIG. 12b is a HRTEM image of AuCu@Pt-3 nanoparticles supported on XC-72 carbon after 30,000 cycles of stability testing.

Conversely, the half-wave potential of the AuCu@Pt-3/C catalyst was essentially unchanged after 30,000 cycles (FIG. 10c) and only 10% loss in the kinetic mass activity was observed (FIG. 10d) after stability testing, which retains similar shape and size (FIG. 12a and FIG. 12b) as the one before this testing (FIG. 8a and FIG. 8b).

The above results indicated that the thickness of the Pt shell played an important role in the catalyst activity and stability.

APPLICATIONS

The abovementioned particles may be used as electrocatalysts.

The abovementioned particles may be used as electrocatalysts in fuel cell technologies.

The catalyst may be applied to petroleum and automobile industries to assist with the complete conversion of unburnt hydrocarbons from the exhaust into carbon dioxide and water vapour.

The particles developed herein may be nano-sized structures comprising binary or ternary metallic systems that are platinum based. This platinum metal may be coated on the inner metallic nanoparticles core or substrate. Such platinum coated nanoparticles may exhibit improved electrocatalytic activity, catalyst durability and stability and reduced platinum loading simultaneously.

Therefore, such particles may not require high platinum loading which is costly and not easily available. The particles may not require the use of a metallic core which has a larger lattice parameter than platinum.

The disclosed method may be used to synthesize the abovementioned particles for use as an electrocatalyst in fuel cell technologies.

The disclosed method may be used to form the abovementioned particles which simultaneously exhibit improved catalytic activity, catalyst durability and stability and reduced platinum loading.

The disclosed method may be used to synthesize particles that have an inner core comprising an alloy material, and an outer shell comprising a metal material on the inner core.

The disclosed method may not require the use of a high amount of platinum for catalyst loading which is costly and not easily available. The disclosed method may not require the coating of the platinum on a metal core that has a larger lattice parameter.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A particle exhibiting catalytic activity comprising:
   (a) an inner core formed of an alloy material; and
   (b) an outer shell formed of a metal material surrounding said inner core wherein said alloy material is selected such that said inner core exerts a compressive strain on said outer shell, and wherein said alloy material has a smaller lattice parameter than said metal material.

2. The particle of claim 1, wherein said metal material forming said outer shell of said particle comprises a transition metal or alloy thereof.

3. The particle of claim 2, wherein said transition metal is selected from the group consisting of platinum (Pt), palladium (Pd), ruthenium (Ru), rhodium (Rh), iridium (Ir) and osmium (Os).

4. The particle of claim 2, wherein said metal material forming said outer shell of said particle is Pt or predominantly Pt material.

5. The particle of claim 1, wherein said alloy material forming said inner core of said particle is an alloy formed from a combination of transition metals selected from the group consisting of gold (Au), silver (Ag), copper (Cu), nickel (Ni), zinc (Zn), cobalt (Co) iron (Fe), platinum (Pt), palladium (Pd), ruthenium (Ru), rhodium (Rh), iridium (Ir) and osmium (Os).

6. The particle of claim 5, wherein said combination of said transition metals is a binary, ternary or a higher combination.

7. The particle of claim 5 wherein said alloy material forming said inner core comprises gold (Au) and at least one transition metal selected from the group consisting of silver (Ag), copper (Cu), nickel (Ni), zinc (Zn), cobalt (Co) iron (Fe), platinum (Pt), palladium (Pd), ruthenium (Ru), rhodium (Rh), iridium (Ir) and osmium (Os).

8. The particle of claim 5, wherein said alloy material is an alloy formed of gold (Au) and copper (Cu).

9. The particle of claim 1, wherein said particle has a particle size in the range of 1 nm to 1 μm.

10. The particle of claim 9, wherein said particle size is in the nano-sized range.

11. The particle of claim 1, wherein said inner core has a thickness in the range of 1 nm to 100 nm.

12. The particle of claim 1, wherein said outer shell has a thickness of one to twenty atomic layers of Pt atoms.

13. The particle of claim 1, wherein said inner core and said outer shell have average diameters that are in a ratio of 1:1 to 1:10.

14. A catalyst comprising a plurality of particles exhibiting catalytic activity, each particle comprising:
   (a) an inner core formed of an alloy material; and
   (b) an outer shell formed of a metal material surrounding said inner core wherein said alloy material is selected such that said inner core exerts a compressive strain on said outer shell, and wherein said alloy material has a smaller lattice parameter than said metal material.

15. A method of forming a particle exhibiting catalytic activity comprising the steps of:
   i) forming an inner core of said particle exhibiting catalytic activity, said inner core comprising an alloy material, and
   ii) forming an outer shell of said particle exhibiting catalytic activity on said inner core, said outer shell comprising a metal material,
   wherein said alloy material is selected such that said inner core exerts a compressive strain on said outer shell, and wherein said alloy material has a smaller lattice parameter than said metal material.

16. The method of claim 15, further comprising the step of synthesizing said alloy material, said alloy material comprising a combination of transition metals selected from the group consisting of gold (Au), silver (Ag), copper (Cu), nickel (Ni), zinc (Zn), cobalt (Co) iron (Fe), platinum (Pt), palladium (Pd), ruthenium (Ru), rhodium (Rh), iridium (Ir) and osmium (Os).

17. The method of claim 16, wherein said synthesizing step comprises the step of agglomerating gold particles with particles comprising at least one transition metal selected from the group consisting of silver (Ag), copper (Cu), nickel (Ni), zinc (Zn), cobalt (Co) iron (Fe), platinum (Pt), palladium (Pd), ruthenium (Ru), rhodium (Rh), iridium (Ir) and osmium (Os), to thereby synthesize said alloy material.

18. The method of claim 15, wherein said forming step (ii) comprises the step of selecting an organic solvent.

19. The method of claim 18, wherein said organic solvent is an amine-based organic solvent.

\* \* \* \* \*